United States Patent [19]

Hart et al.

[11] Patent Number: 4,469,841

[45] Date of Patent: Sep. 4, 1984

[54] LATENT ACID CATALYST FOR WATERBORNE COATINGS

[75] Inventors: Donald J. Hart, Sterling Heights; Robert A. Ottaviani, Washington, both of Mich.

[73] Assignee: General Motors Corporation, Detroit, Mich.

[21] Appl. No.: 472,235

[22] Filed: Mar. 4, 1983

[51] Int. Cl.$^3$ .................... C08K 5/43; C08L 33/14
[52] U.S. Cl. ........................ 524/512; 525/162
[58] Field of Search .................. 524/512; 525/162

[56] References Cited

U.S. PATENT DOCUMENTS

| | | |
|---|---|---|
| 3,317,474 | 5/1967 | Jones . |
| 3,487,048 | 12/1969 | Deuzeman .................. 528/242 |
| 3,773,710 | 11/1973 | Victorius .................. 524/512 |
| 3,775,512 | 11/1973 | Lanthier .................. 525/162 |
| 3,996,177 | 12/1976 | Ludwig .................... 524/512 |
| 4,157,994 | 6/1979 | Totty et al. ............... 524/512 |
| 4,221,683 | 9/1980 | Nakate et al. ............. 525/162 |
| 4,273,669 | 6/1981 | Piesch et al. . |
| 4,307,208 | 12/1981 | Chatta .................... 525/162 |
| 4,330,458 | 5/1982 | Spinelli et al. ........... 525/162 |

FOREIGN PATENT DOCUMENTS 695439  10/1964  Canada ................. 525/162

OTHER PUBLICATIONS

*Chemical Abstracts* vol. 73, (1970), 99596r.

*Primary Examiner*—C. Warren Ivy
*Attorney, Agent, or Firm*—George A. Grove

[57] ABSTRACT

Waterborne acrylic copolymer-melamine enamels have a long storage life at room temperature and yet are curable at relatively low temperatures when containing suitable sulfamate ester curing agents such as ethyl N,N-dimethylsulfamate.

2 Claims, 2 Drawing Figures

LATENT ACID CATALYST FOR WATERBORNE COATINGS

This invention pertains to water base paints incorporating acrylic ester copolymer-melamine resin binders. More specifically, this invention pertains to latent acid catalysts for such paints that promote relatively low temperature cure.

Waterborne topcoat enamels having acrylic-melamine resin binders are used on automobiles. The resin employs an acid constituent that promotes resin cure when the paint film is heated to a temperature of the order of 163° C. (325° F.). The acid constituent, typically a derivative of p-toluenesulfonic acid, is incorporated in the backbone of the acrylic ester copolymer resin. Curing of the paint film results from crosslinking reactions between hydroxyl groups on the acrylic resin and methylol or other alkoxy groups on the melamine resin as well as self-condensation of the melamine constituent. Such resins have served very satisfactorily in topcoat enamels. However, it is desired to provide a paint formulation that can be cured at lower temperatures, such as about 121° C. (250° F.). The present higher temperature bake ovens require natural gas or electrical heaters as the energy source. A lower temperature curable resin could be cured using low pressure steam as the energy source.

The cure temperature of the present resins might be lowered by either increasing the acid catalyst concentration or by changing the formulation to a more reactive melamine-formaldehyde resin. Both of these changes would reduce the storage stability of the paint.

It is an object of our invention to provide an acid catalyst for promoting the cure of waterborne acrylic ester copolymer-melamine resin paints such that the paint has a long storage life at room temperature but is curable to a durable thermoset paint film at relatively low temperatures. It is a further object of this invention to provide waterborne acrylic-melamine enamel composition that is stable at normal ambient temperatures but curable at relatively low baking temperatures.

SUMMARY OF THE INVENTION

In accordance with a preferred embodiment of our invention, these and other objects are accomplished by using ethyl, N,N-dimethylsulfamate as the acid catalyst ingredient in the waterborne paint system. Other lower alkyl derivatives of this preferred catalyst may be used as will be specified below.

This sulfamate compound is liquid at room temperature and dispersible in waterborne acrylic ester copolymer-melamine resin enamel compositions. While the amount of the catalyst used may be varied according to the needs of the formulator, typically about 1% to 2% by weight of the sulfamate is employed based on the weight of the resin constituent of the enamel. At room temperature the sulfamate ester is inactive in the enamel composition. After the enamel has been sprayed or otherwise suitably applied to a workpiece, the film is baked to dry and cure the film. During baking, the ethyl N,N-dimethylsulfamate

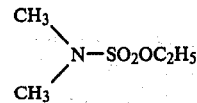

sequentally undergoes the following reactions. The sulfamate undergoes a molecular rearrangement in which the ethyl radical of the ester migrates to the nitrogen atom, forming a betaine

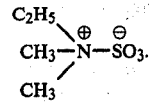

The betaine adsorbs water to form a trialkyl ammonium bisulfate salt

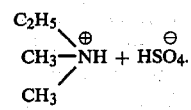

It subsequently decomposes to volatile dimethyl ethyl amine and sulfuric acid. The resin cure is promoted by the sulfuric acid thus produced. As stated above, the curing of the resin is a composite of self-condensation of the melamine-formaldehyde resin and crosslinking reactions of alkoxy or methylol groups on the melamine-formaldehyde resin with hydroxyl groups on the acrylic resin.

Ethyl N,N-dimethylsulfamate is inactive in the waterborne enamels at room temperature. It is fully active as an acid catalyst at about 121° C. (250° F.) and will promote the cure of suitably formulated acrylic-melamine resins.

Other objects and advantages of our invention will become apparent from a detailed description thereof which follows. Reference will be made to the drawings in which:

FIG. 1 is a graph depicting the curing profile of prior art commercially available resin at temperatures of 107° C., 121° C. and 163° C.; and FIG. 2 is a graph depicting the curing profile of a resin of the subject invention at 121° C. with two levels of ethyl N,N-dimethylsulfamate.

DETAILED DESCRIPTION

Figure 1:
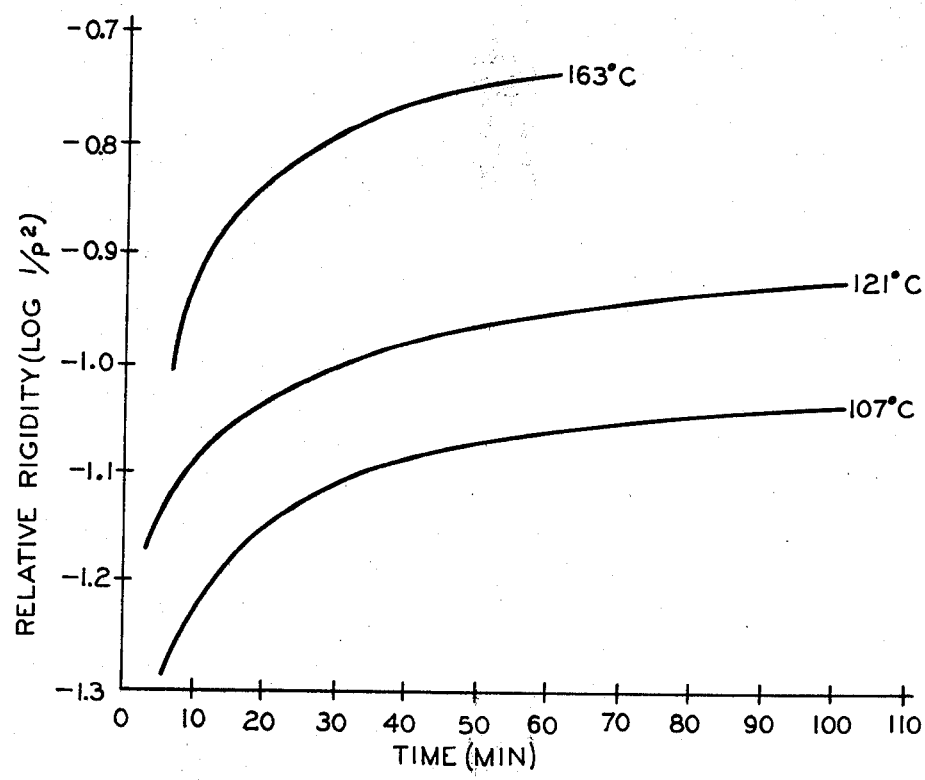

The practice of our invention is based on the use of a water dispersible sulfamate ester that is inert with respect to the binder resin system at normal paint storage temperatures. However, upon heating to relatively modest curing temperatures, the sulfamate ester undergoes a rearrangement to its betaine form which hydrolyzes and then decomposes to form a fugitive amine and sulfuric acid. The sulfuric acid, of course, is the acid catalyst that promotes the cure of the thermosetting resin system.

We prefer to use ethyl, N,N-dimethylsulfamate as our latent catalyst. It is readily dispersible in suitable quantities in the waterborne paint formulation and it readily undergoes the necessary chemical actions to produce sulfuric acid at temperatures attainable with low pressure steam. Other lower alkyl sulfamate esters are suitable. For example, methyl N-ethyl-N methyl sulfamate may be used. Also, methyl and ethyl N-pyrrolidine sulfamate and methyl and ethyl piperidine sulfamate are suitable We prepared ethyl N,N-dimethylsulfamate by the method described in Paul F. Ziegler's "A Study of Sulfamic Acid Ester Rearrangements", Ph.D. Thesis, University of Cincinnati, 1963. Our sulfamate product was distilled under vacuum, giving a colorless liquid; boiling point 50° C./0.70 Torr; melting point −22° C.; refractive index (26° C.) 1.4184; NMR (CDCl$_3$) δ 1.38 (t, J=7.2 Hz, 3H), 2.88 (s, 6H), 4.24 (q, J=7.2 Hz, 2H); IR matched the Ziegler spectrum. Anal. Calcd. for C$_4$H$_{11}$NO$_3$S: C, 31.36; H, 7.24; N, 9.14. Found: C, 31.50; H, 7.28; N, 8.95.

Waterborne enamels curable with sulfamate esters comprise an acrylic copolymer resin constituent and a melamine constituent. The melamine constituent is suitably a hexaalkoxy methylol melamine in which some of the alkoxy groups are methoxy and some are butoxy groups. As is known, the proportions of methyl and butyl substituents may be controlled to suitably affect the rate of cure or properties of the resin. The melamine is soluble or dispersible in water.

Water dispersible acrylic copolymer resins are copolymers of acrylic and/or methacrylic acid monomers and one or more acrylic and/or methacrylic ester monomers. Styrene may also be used as a filler. The art of formulating water dispersible acrylic copolymer resins is known. The copolymer resin contains sufficient acid monomer blocks so that the copolymer can be reacted with an amine to render the resin water dispersible. Acrylic ester monomer blocks are selected to provide flexibility and other desirable properties in the cured resin. The copolymer must also contain pendant hydroxyl groups along the polymer backbone for crosslinking with the melamine constituent.

We used a commercially available acrylic enamel topcoat resin representative of the water dispersed acrylic-melamine resin systems to which our invention is applicable. Two forms of the resin were used. One form contained an acid catalyst (a derivative of p-toluenesulfonic acid) incorporated into the resin. The other resin was chemically the same except that it incorporated no acid curing agent. We employed the resins in clear, unpigmented form and in formulations containing white pigment.

The internally catalyzed acrylic copolymer resin was the polymerization reaction product of:
10% hydroxy acrylic monomer (such as 2-hydroxyethyl methacrylate),
30% styrene,
17% methyl methacrylate,
36% low Tg acrylic monomer of butyl type (such as butyl methacrylate),
6½% acid monomer (such as methacrylic acid),
½% internal acid catalyst-derivative of p-toluenesulfonic acid.

The number average molecular weight of the resin was about 36,000. It was reacted with an amine, dimethylamino ethanol, so that the resin could be dispersed in water. When no internal acid catalyst was used, the respective proportions of the other constituents were the same.

The melamine constituent of the acrylic binder resin is a hexaalkoxy methylol derivative of melamine. Following is an idealized structure of the melamine monomer.

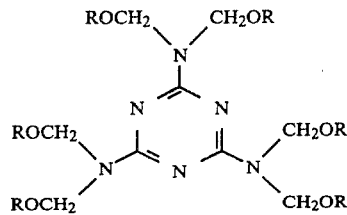

Each R is suitably a methyl group or a butyl group. In the enamel we used, the melamine was a polymerized derivative (e.g., dimer or trimer) of the above structure in which the alkyl groups were primarily butyl.

About 80% by weight of the enamel binder resin was the acrylic copolymer and 20% was the melamine derivative. The pigmented enamels contained nine parts by weight pigment to twenty-four parts resin.

The cure of the waterborne resins was followed by the use of a Chemical Instruments Corporation torsional braid analyzer (TBA). The test specimens were prepared by soaking a fiberglass braid in the appropriate waterborne resin for a minimum of three hours and then hanging the braid vertically under some light tension for thirty minutes to allow the resin to flash. The TBA itself was allowed to stabilize at the appropriate cure temperature for thirty minutes before any testing was conducted. The impregnated braid was then lowered into the TBA and the torsional pendulum in the TBA was intermittently set into oscillation to generate a series of freely damped waves. The period (p) of the resulting waves is related to the relative rigidity (log 1/p$^2$) of the resin which, in turn, is directly proportional to the in-phase or elastic portion of the shear modulus. As the resin cures, the resin's modulus changes. Since the period of the waves changes as the modulus changes, the TBA provides a convenient method of following the cure. Each cure condition was run in duplicate or triplicate.

As a standard for comparison we studied the cure of the commercial unpigmented acrylic-melamine waterborne resin incorporating the sulfonic acid derivative at the standard cure temperature of 163° C. (325° F.). The degree of cure with time of this resin is depicted in FIG. 1. The curing rate and the final relative rigidity was much higher than the cures effected at lower temperatures. The resins cured at 107° C. and 121° C., respectively, were slower, had lower rigidity, and probably would not have been suitably cured for use in automotive topcoat applications.

Figure 2:
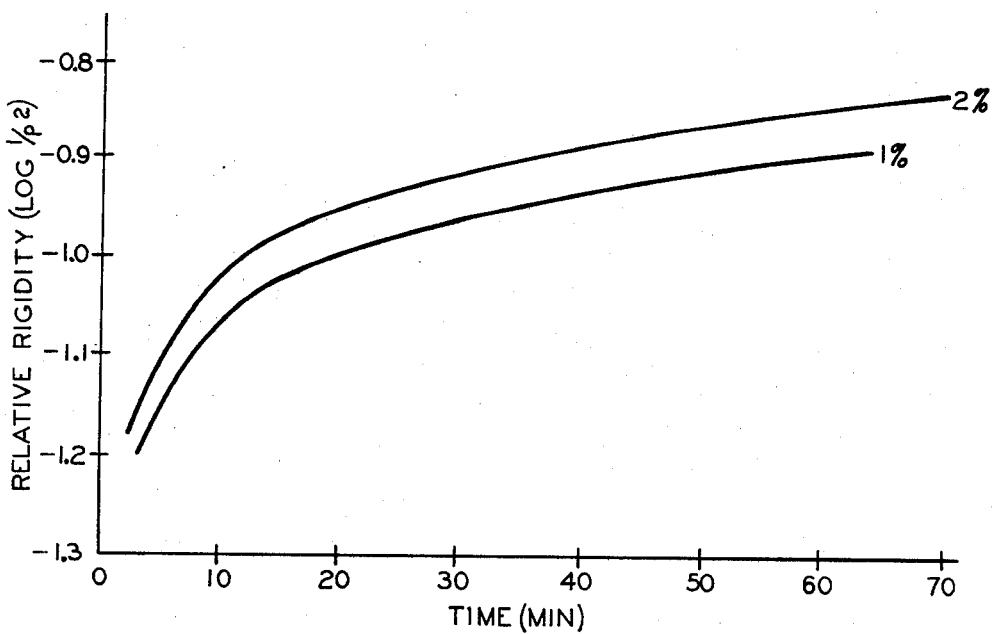

We prepared a formulation containing the internally uncatalyzed commercial acrylate-melamine resin using ethyl N,N-dimethylsulfamate as the latent curing agent. When a quantity of sulfamate ester equal to 1% by weight of the resin was incorporated and a film produced and baked at 163° C., the curing profile was comparable to or better than the resin cured with the sulfonic acid derivative (FIG. 1). We prepared like resins containing, respectively, 1% and 2% ethyl N,N-dimethylsulfamate, and the several resins were cured at 121° C. Curing profiles for these samples are depicted in FIG. 2. None of these cure profiles indicated a degree of cure as great as that at 163° C. However, we have demonstrated that the sulfamate ester rearranges and reacts to form sulfuric acid at 121° C. Resin cures with 1% and 2% levels of curing agent are more complete than cures produced by the conventional internally catalyzed resin at the same temperature. More conventional methods of determining extent of cure, such as film hardness and durability measurements, were run on pigmented coatings and found to parallel the results obtained from the TBA. Of equal importance, our formulations containing 2 weight percent ethyl N,N-dimethylsulfamate (based on weight of resin) had no increase in viscosity after two years. In contrast, solutions containing unblocked p-toluenesulfonic acid at the same molar level gelled within four days.

Ethyl N,N-dimethylsulfamate effectively promotes the cure of acrylic-melamine resins at temperatures of the order of 121° C. and above. Likewise, other closely related sulfamate esters such as those identified above are deemed suitable as curing agents for acrylic copolymer-melamine resin compositions. Acrylic-melamine enamels incorporating such sulfamate curing agents are stable at room temperature. The sulfamates, although not internal catalysts, are latent at room temperature. However, they react to generate sulfuric acid in the paint film and this acid promotes the cure of the binder resin.

The specific resin formulations tested with ethyl N,N-dimethylsulfamate did not display a curing profile likely to be acceptable for an automotive topcoat paint film, but it did produce a cured, durable film. Reformulation of the acrylic and melamine resins to provide additional crosslinking sites on the resins would improve the curing profile as measured by our torsional braid analyzer.

Thus, we have provided a family of acrylicmelamine enamel formulations containing latent sulfamate ester curing agents. There may be considerable latitude in the composition of the acrylic copolymer resin and the melamine constituent providing they are curable or partially curable by acid catalyzed reaction between active hydroxyl groups on the acrylic copolymer and suitable alkoxy groups on the melamine. The sulfamate ester content is likewise at the discretion of the formulator. However, it is expected that it will be typically below about 5% by weight of the resin content of the waterborne paint.

While our invention has been described in terms of certain specific embodiments thereof, it will be appreciated that other forms of the invention could readily be adapted by one skilled in the art. Accordingly, the scope of our invention is to be considered limited only by the following claims.

The embodiments of the invention in which an exclusive property or privilege is claimed are defined as follows:

1. An acrylic water dispersible paint binder resin composition storable at normal ambient conditions, but curable by acid catalysts at paint bake temperature of the order of about 121° C. or higher, said composition comprising a melamine compound containing alkoxy groups for crosslinking and self-condensation, an acrylic copolymer resin containing carboxylic acid groups for water dispersibility and pendant hydroxy groups for crosslinking with said melamine compound and a N,N-lower dialkyl, lower alkyl sulfamate ester nonreactive at paint storage temperatures but reactive at a said paint bake temperature to generate acid curing catalyst.

2. A storable acrylic water base paint curable by acid catalysis at paint film bake temperatures of the order of about 121° C. or higher, comprising an acrylic copolymer resin containing carboxylic acid groups for water dispersibility and pendant hydroxy groups for crosslinking, a melamine compound containing alkoxy groups for self-condensation and for crosslinking with said acrylic resin and ethyl N,N-dimethylsulfamate.

* * * * *